United States Patent
Varma et al.

(10) Patent No.: US 8,717,981 B1
(45) Date of Patent: May 6, 2014

(54) PRIORITY ALLOCATION OF CONTENTION RESOURCES

(75) Inventors: Subir Varma, Ashburn, VA (US);
George A. Georgiou, Olathe, KS (US);
Durga Prasad Satapathy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1058 days.

(21) Appl. No.: 12/113,615

(22) Filed: May 1, 2008

(51) Int. Cl.
*H04W 4/00* (2009.01)
*H04M 11/04* (2006.01)
*H04W 28/04* (2009.01)
*H04W 72/04* (2009.01)
*H04W 76/00* (2009.01)

(52) U.S. Cl.
CPC .............. *H04W 28/04* (2013.01); *H04W 72/04* (2013.01); *H04W 76/007* (2013.01)
USPC .......................... 370/329; 455/404.1; 370/330

(58) Field of Classification Search
CPC .............................. H04W 76/007; H04W 4/22
USPC .......................................................... 370/329
See application file for complete search history.

(56) References Cited

U.S. PATENT DOCUMENTS

| | | | | |
|---|---|---|---|---|
| 5,644,576 A | * | 7/1997 | Bauchot et al. | 370/437 |
| 6,826,160 B1 | * | 11/2004 | Wang et al. | 370/329 |
| 6,980,540 B1 | | 12/2005 | Laroia et al. | |
| 8,149,737 B2 | * | 4/2012 | Metke et al. | 370/256 |
| 2002/0105918 A1 | * | 8/2002 | Yamada et al. | 370/294 |
| 2003/0137993 A1 | * | 7/2003 | Odman | 370/468 |
| 2004/0184406 A1 | * | 9/2004 | Iwamura | 370/235 |
| 2006/0034239 A1 | * | 2/2006 | Abeta et al. | 370/341 |
| 2006/0189272 A1 | * | 8/2006 | Willenegger et al. | 455/3.01 |
| 2006/0212588 A1 | * | 9/2006 | Haner et al. | 709/229 |
| 2006/0264177 A1 | * | 11/2006 | Heidari-Bateni et al. | 455/62 |
| 2008/0298299 A1 | * | 12/2008 | Thesling | 370/316 |
| 2009/0067389 A1 | * | 3/2009 | Lee et al. | 370/336 |
| 2009/0097444 A1 | * | 4/2009 | Lohr et al. | 370/329 |
| 2009/0116434 A1 | * | 5/2009 | Lohr et al. | 370/329 |
| 2009/0247205 A1 | * | 10/2009 | Sennett et al. | 455/512 |

* cited by examiner

Primary Examiner — Shaq Taha (57) ABSTRACT

A first set of uplink contention slots is allocated for use by a first set of devices. A second set of uplink contention slots is allocated for use by a second set of devices. The first set of uplink contention slots and the second set of uplink contention slots may or may not share contention slots. The first set of uplink contention slots is communicated to the first set of devices. The second set of uplink contention slots is communicated to the second set of devices.

4 Claims, 7 Drawing Sheets

PRIORITY ALLOCATION OF CONTENTION RESOURCES

TECHNICAL BACKGROUND

Wireless communication may be used as a means of accessing a communication network and has certain advantages over wired communications for accessing a communication network. One of those advantages is a low cost of infrastructure to provide access to many separate mobile devices. To use wireless communication to access a network, a customer device needs to have at least one transceiver in active communication with another transceiver that is connected to the network.

To facilitate wireless communication, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as evolution-data optimized (EVDO). The European Telecommunications Standards Institute (ETSI) has also promulgated a standard known a long term evolution (LTE). All of these standards may include specifications for various aspects of wireless communication with a network. This includes processes for registering on the network, carrier modulation, frequency bands of operation, and message formats.

OVERVIEW

A method of allocating contention resources is disclosed. A set of uplink contention slots are allocated for use by a first set of devices. A subset of these uplink contention slots are allocated for use by the first set of devices and a second set of devices. The set of uplink contention slots is communicated to the first set of devices. The subset of the set of uplink contention slots is communicated to the second set of devices.

A first set of uplink contention slots is allocated for use by a first set of devices. A second set of uplink contention slots is allocated for use by a second set of devices. The first set of uplink contention slots and the second set of uplink contention slots do not share contention slots. The first set of uplink contention slots is communicated to the first set of devices. The second set of uplink contention slots is communicated to the second set of devices.

A first registration request is received from a first device. The first device is associated with a public safety function. A second registration request is received from a second device. A first set of bandwidth contention slots is communicated to the first device. A second set of bandwidth contention slots is communicated to the second device. The first set of bandwidth contention slots contains at least one bandwidth contention slot not included in the second set of bandwidth contention slots.

DETAILED DESCRIPTION

Figure 1:
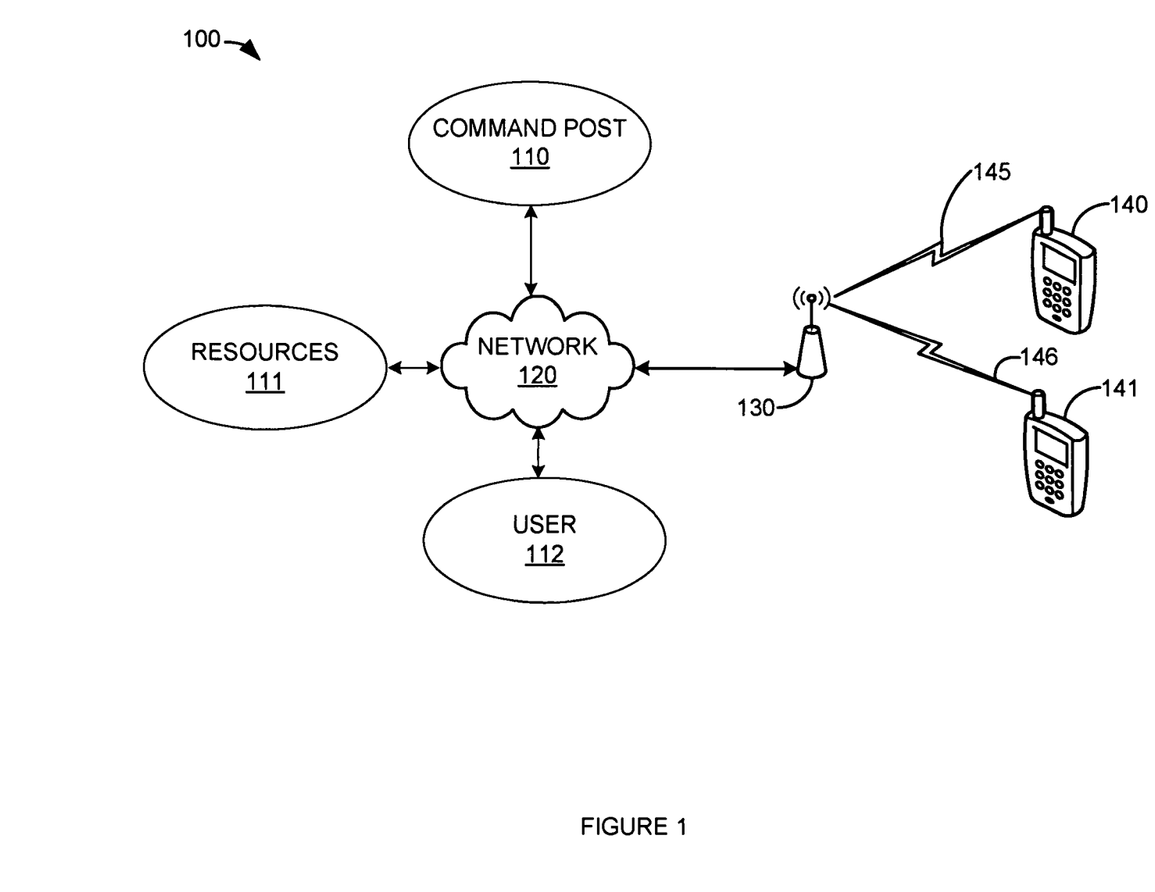
FIG. 1 is a block diagram illustrating a communication system.

FIG. 1 is a block diagram illustrating a communication system. In FIG. 1, communication system 100 comprises: command post 110; resources 111; user 112, network 120; base station 130; wireless device 140; wireless device 141; wireless link 145; and wireless link 146. Command post 110 is operatively coupled to network 120. Resources 111 is operatively coupled to network 120. User 112 is operatively coupled to network 120. Base station 130 is operatively coupled to network 120.

Wireless device 140 is operatively coupled to base station 130 via wireless link 145. Wireless device 141 is operatively coupled to base station 130 via wireless link 146. Thus, wireless device 140 may be operatively coupled to command post 110, resources 111, or user 112 via wireless link 145, base station 130, and network 120. Likewise, wireless device 141 may be operatively coupled to command post 110, resources 111, or user 112 via wireless link 146, base station 130, and network 120.

Wireless devices 140 and 141, command post 110, resources 111, and user 112 may be any device, system, or other such communication platform capable of communicating with each other via network 120. Wireless devices 140 and 141, command post 110, resources 111, and user 112 may be, for example, one or more of expanded function telephone, a mobile phone, a wireless phone, a wireless modem, a personal digital assistant (PDA), a computer system with a sound input, output, and an internet connection, a computer with a public switched telephone network (PSTN) connection and a modem, a computer with a network card, an access terminal, a voice over internet protocol (VoIP) phone, a voice over packet (VOP) phone, or a soft phone, as well as other types of devices or systems.

Network 120 may comprise a computer, a network, or a collection of computers and networks that couple, link, or otherwise operatively provide wireless devices 140 and 141 with communication service. Network 120 could be any network or collection of networks that couple, link, or otherwise operatively connect wireless devices 140 and 141 with other devices, command post 110, resources 111, or user 112 via base station 130. It should be understood that network 120 may also connect command post 110 with resources 111, or user 112. It should be understood that network 120 may comprise secondary data networks. For example, network 120 may include a backhaul network, a local network, a long distance network, a packet network, or any combination thereof, as well as other types of networks. Network 120 may include an access service network (ASN), an access service network gateway (ASN-GW), wireless local access network access gateway (WAG), packet data gateway (PDG), mobile switching center (MSC) and packet data serving node (PDSN).

Base station 130 may be any wireless system that provides the air interface to wireless devices 140 and 141 and communication connectivity to network 120. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Wireless device 140 may be associated with a public safety function. For example, wireless device 140 may be used by public safety personnel. Examples of public safety functions are police, fire department, disaster response, emergency medical personnel, and government officials. Wireless device 140 may be used by a public safety function to communicate with other public safety functions such as command post 110 and resources 111. Base station 130 may determine that wireless device 140 is associated with a public safety function when base station 130 receives a registration message from wireless device 140. In an embodiment, the registration message received by base station 130 may indicate that wireless device 140 is associated with a public safety function. In an embodiment, base station 130 or network 120 may determine wireless device 140 is associated with a public safety function by querying a database.

Wireless device 141 may be associated with a standard subscriber. For example, wireless device 141 may be associated with a member of the general public. Wireless device 141 may be used by a standard subscriber to communicate with user 112 who is also a member of the general public. Base station 130 may determine that wireless device 141 is associated with standard subscriber when base station 130 receives a registration message from wireless device 141. In an embodiment, the registration message received by base station 130 may indicate that wireless device 141 is associated with a standard subscriber. In an embodiment, base station 130 or network 120 may determine wireless device 141 is associated with a standard subscriber by querying a database.

To communicate with network 120, wireless device 140 and wireless device 141 may exchange data with base station 130 via wireless links 145 and 146, respectively. Data flow from wireless device 140 or wireless device 141 to base station 130 is, for the purposes of this discussion, referred to as the uplink direction. Data flow from base station 130 to wireless device 140 or wireless device 141 is, for the purposes of this discussion, referred to as the downlink direction.

Because wireless device 140 and wireless device 141 share the same frequency band, uplink transmissions from wireless device 140 and 141 are multiplexed in both time and frequency. Each unique combination of time (or symbol) and frequency is called a slot. Base station 130 may dynamically allocate slots for wireless device 140 to use to transmit data. Base station 130 may also allocate different slots for wireless device 141 to use to transmit data. In addition, base station 130 may allocate a shared set of slots to both wireless device 140 and wireless device 141. In this case, wireless device 140 and wireless device 141 contend with each other for the use of the shared set of slots.

Base station 130 may allocate a set of shared slots for wireless device 140 and wireless device 141 to use to ask for additional allocations of slots (i.e., bandwidth requests). As with other shared slots, wireless device 140 and wireless device 141 contend with each other for the use of these bandwidth contention slots.

For example, wireless device 140 may randomly select a bandwidth contention slot. Wireless device 140 may then transmit a bandwidth request to base station 130 using this randomly selected bandwidth contention slot. If wireless device 140 does not receive a response from base station 130 granting bandwidth, then wireless device 140 may assume that the bandwidth request message was lost due to a collision with another wireless device (e.g., wireless device 141) that had also randomly selected that slot. Wireless device 140 may repeatedly randomly select another slot, and send another bandwidth request message until a request for bandwidth is granted.

In an embodiment, base station 130 allocates special contention slots (public safety contention slots) that are designated specifically for use by wireless devices associated with a public safety function (e.g., wireless device 140). These slots may not be shared with the contention slots allocated for use by wireless devices associated with standard subscribers (e.g., wireless device 141). Base station 130 communicates the public safety contention slots to wireless devices associated with a public safety function. Base station 130 communicates the non-public safety contention slots to the wireless devices associated with standard subscribers. Thus, base station 130 is able to differentiate bandwidth request messages coming from wireless devices associated with a public safety function from those coming from wireless devices associated with a standard subscriber. Base station 130 is then able to grant higher priority to the bandwidth requests coming from wireless devices associated with a public safety function.

In an embodiment, the number of public safety contention slots may be allocated dynamically. The basis for the allocation may be a load factor. For example, the number of public safety contention slots can be a function of or more parameters that are configured by an operator. In an example, a parameter may be the number of registered or active users in the system. Basing the number of public safety contention slots on the number of registered or active users in the system relies on the notion that the lower bound on the volume of calls to/from public safety function personnel is proportional to the number of registered or active users.

In another example, the number of public safety contention slots may be based on the rate of increase of bandwidth requests. This rate of increase may be based on the rate of increase of bandwidth requests made in the public safety contention slots. This rate of increase may be based on the rate of increase of bandwidth requests made in the standard subscriber contention slots. Basing the number of public safety contention slots on the rate of increase in bandwidth requests relies on the notion that an abnormal increase should be taken to show a need to increase the allocation of public safety contention slots.

In another example, a message may be sent from network 120 or other base stations (not shown) that causes the allocation of public safety contention slots to be adjusted. The event causing a message to be sent from network 120 may be an alarm or other condition detected in the network operations center (NOC). The event causing a message to be sent may be triggered by a nearby base station increasing its allocation of public safety contention slots. This increase by a nearby base station may indicate an increased likelihood that base station 130 needs to increase its allocation of public safety contention slots.

Figure 2:
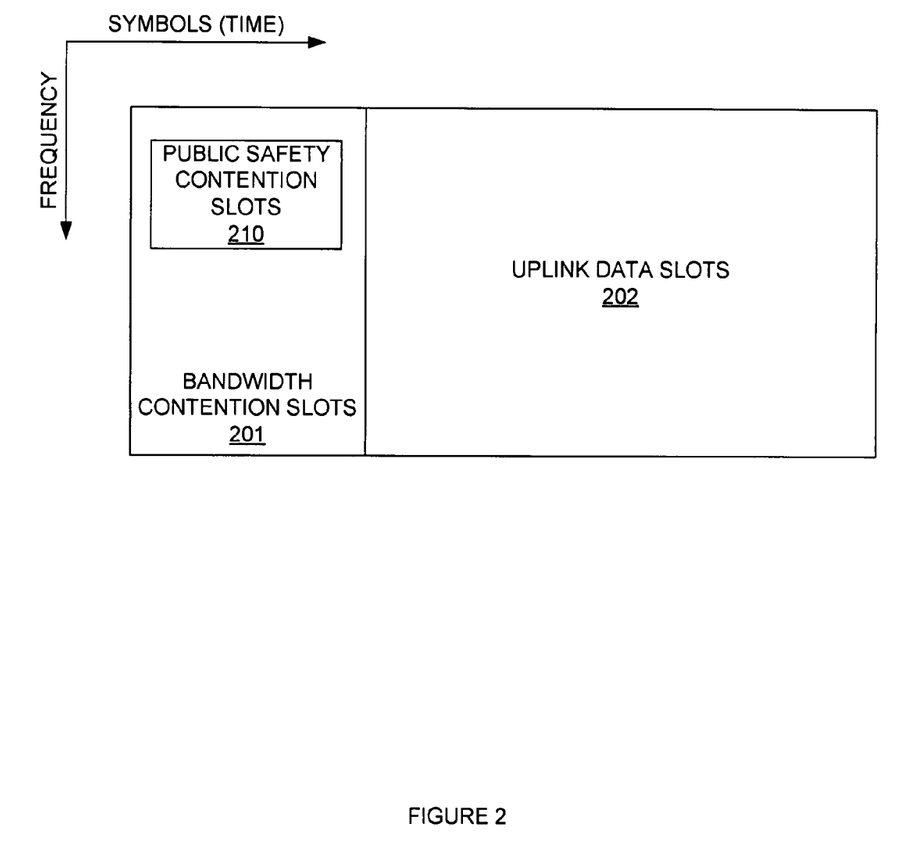
FIG. 2 is an illustration of an uplink allocation.

FIG. 2 is an illustration of an uplink allocation. In FIG. 2, groups of slots are shown with frequency on the vertical axis and symbols (e.g., time) on the horizontal axis. In FIG. 2, there is shown an allocation of uplink slots to bandwidth contention slots 201 and uplink data slots 202. Included in bandwidth contention slots 201 is a block of public safety contention slots 210. Thus, the allocation of bandwidth contention slots 201 is separated into slots that are for the exclusive use by wireless devices associated with a public safety function (i.e., public safety contention slots 210) and the remaining slots that may be used by wireless devices associated with standards subscribers. In an embodiment, the remaining bandwidth contention slots that are not allocated as public safety contention slots may also be used by wireless devices associated with a public safety function.

Figure 3:
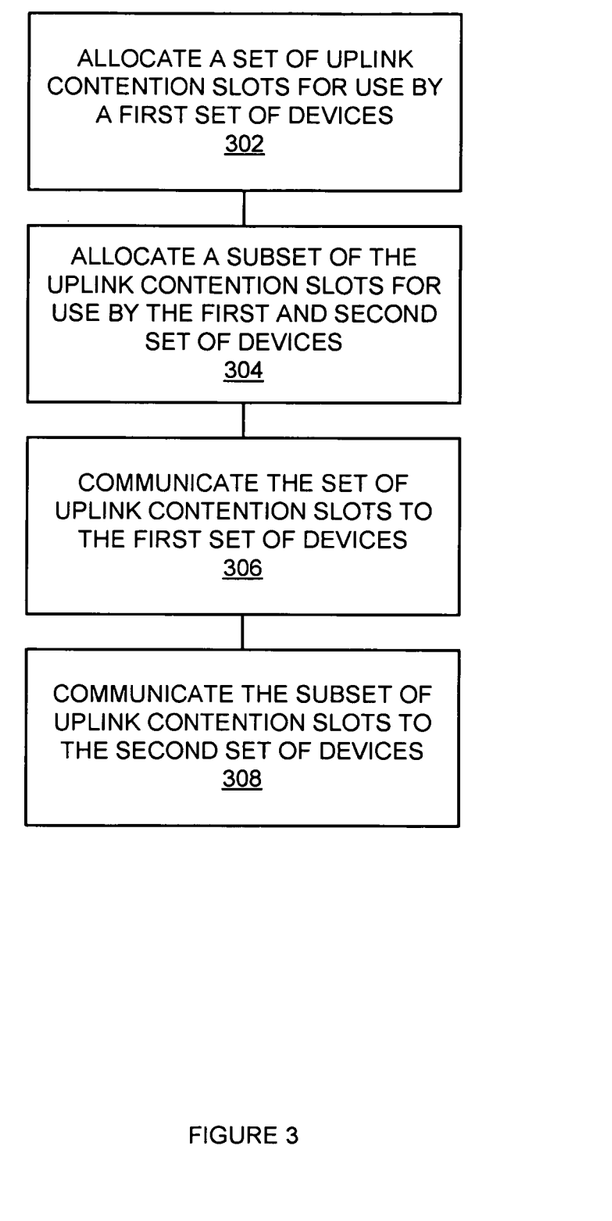
FIG. 3 is a flowchart of a method for allocating contention resources.

FIG. 3 is a flowchart of a method for allocating contention resources. The steps illustrated in FIG. 3 may be performed by communication system 100.

A set of uplink contention slots is allocated for use by a first set of devices (302). For example, base station 130 may allocate a set of bandwidth contention slots for use by wireless devices associated with a public safety function (e.g., wireless device 140).

A subset of the uplink contention slots is allocated for use by the first set of device and a second set of devices (304). For example, base station 130 may allocate a subset of the bandwidth contention slots allocated in block 302 for use by wireless devices associated with a public safety function and wireless devices associated with standards subscribers (e.g., wireless device 141). Thus, the bandwidth contention slots not part of the subset allocated for use by both types of wireless devices will be exclusively available to wireless devices associated with a public safety function (public safety contention slots). By allowing the wireless devices associated with public safety functions to contend for bandwidth in an exclusive area and a shared area, a bad choice in the number of public safety contention slots (i.e., too few slots) does not prevent the wireless devices associated with a public safety function from obtaining bandwidth.

The set of uplink contention slots is communicated to the first set of devices (306). For example, base station 130 may communicate the set of bandwidth contention slots to a wireless device associated with a public safety function (e.g., wireless device 140).

The subset of uplink contention slots is communicated to the second set of devices (308). For example, base station 130 may communicate the subset of the bandwidth contention slots allocated in block 304 to standard subscribers (e.g., wireless device 141).

Figure 4:
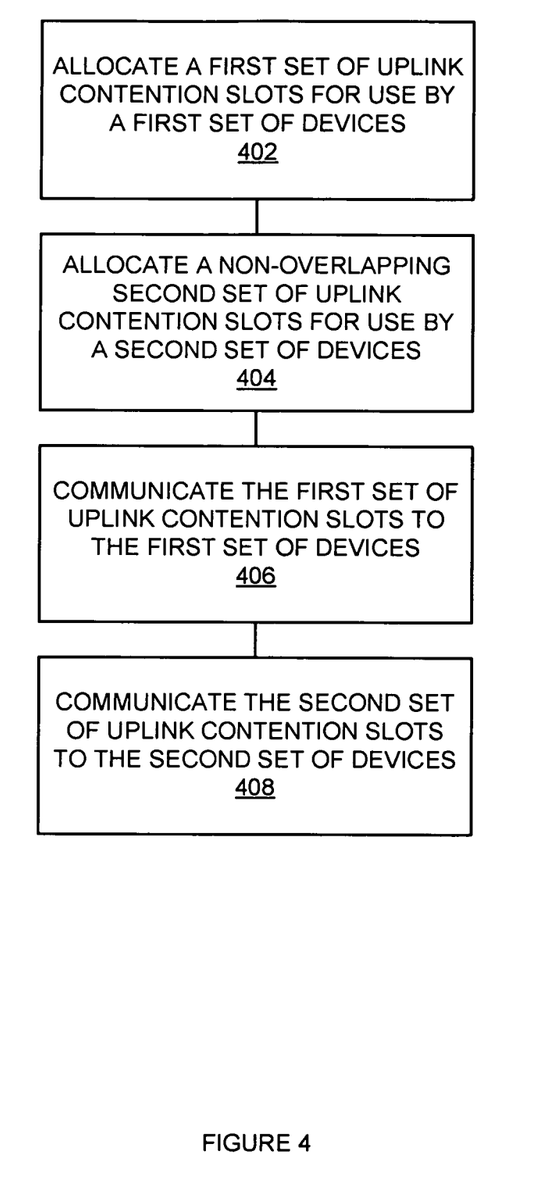
FIG. 4 is a flowchart of a method for allocating contention resources.

FIG. 4 is a flowchart of a method for allocating contention resources. The steps illustrated in FIG. 4 may be performed by communication system 100.

A first set of uplink contention slots is allocated for use by a first set of devices (402). For example, base station 130 may allocate a set of public safety contention slots that are exclusively for use by wireless devices associated with a public safety function (e.g., wireless device 140).

A non-overlapping second set of uplink contention slots is allocated for use by a second set of devices (404). For example, base station 130 may allocate a set of bandwidth contention slots for use by wireless devices associated with standard subscribers. The set of bandwidth contention slots may not overlap with the set of public safety contention slots allocated in block 402. Thus, the public safety contention slots and the bandwidth contention slots used by standard subscribers are non-overlapping. This non-overlapping characteristic ensures that wireless devices associated with a public safety function will not compete with wireless devices associated with standard subscribers for uplink bandwidth contention slots.

The first set of uplink contention slots is communicated to the first set of devices (406). For example, base station 130 may communicate a set of public safety contention slots to wireless devices associated with a public safety function (e.g., wireless device 140).

The second set of uplink communication slots is communicated to the second set of devices (408). For example, base station 130 may communicate the set of bandwidth contention slots not allocated as public safety contention slots to wireless devices associated with standard subscribers (e.g., wireless device 141).

Figure 5:
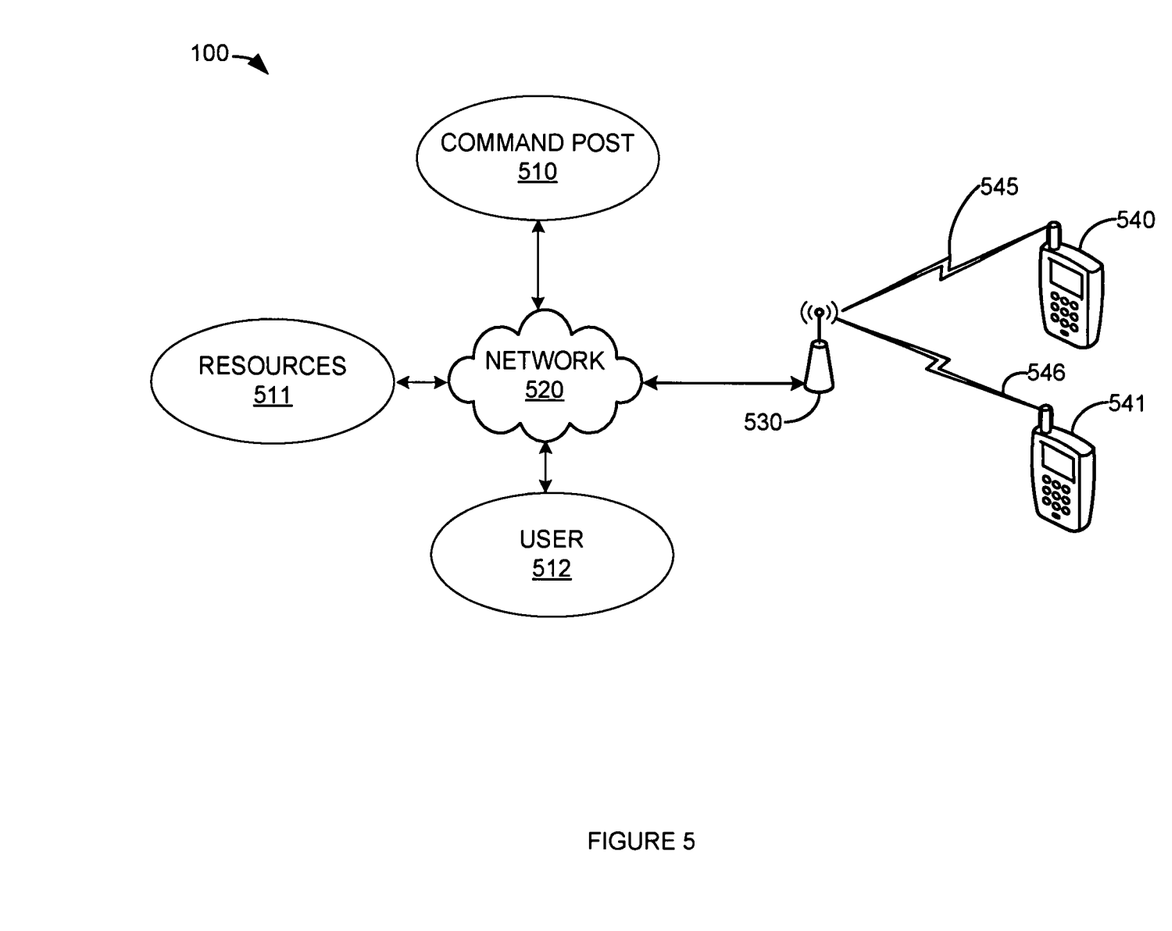
FIG. 5 is a block diagram illustrating a WiMAX communication system.

FIG. 5 is a block diagram illustrating a WiMAX communication system. In FIG. 5, WiMAX communication system 500 comprises: command post 510; resources 511; user 512; network 520; base station 530; wireless device 540; wireless device 541; WiMAX wireless link 545; and WiMAX wireless link 546. Command post 510 is operatively coupled to network 520. Resources 511 is operatively coupled to network 520. User 512 is operatively coupled to network 520. Base station 530 is operatively coupled to network 520.

Wireless device 540 is operatively coupled to base station 530 via WiMAX wireless link 545. Wireless device 541 is operatively coupled to base station 530 via WiMAX wireless link 546. Thus, wireless device 540 may be operatively coupled to command post 510, resources 511, or user 512 via WiMAX wireless link 545, base station 530, and network 520. Likewise, wireless device 541 may be operatively coupled to command post 510, resources 511, or user 512 via WiMAX wireless link 546, base station 530, and network 520.

Wireless devices 540 and 541, command post 510, resources 511, and user 512 may be any device, system, or other such communication platform capable of communicating with each other via network 520. Wireless devices 540 and 541, command post 510, resources 511, and user 512 may be, for example, one or more of expanded function telephone, a mobile phone, a wireless phone, a wireless modem, a PDA, a computer system with a sound input, output, and an internet connection, a computer with PSTN connection and a modem, a computer with a network card, an access terminal, a VoIP phone, a VOP phone, or a soft phone, as well as other types of devices or systems.

Network 520 may comprise a computer, a network, or a collection of computers and networks that couple, link, or otherwise operatively provide wireless devices 540 and 541 with communication service. Network 520 could be any network or collection of networks that couple, link, or otherwise operatively connect wireless devices 540 and 541 with other devices, command post 510, resources 511, or user 512. It should be understood that network 520 may also connect command post 510 with resources 511, or user 512. It should be understood that network 520 may comprise secondary data networks. For example, network 520 may include a backhaul network, a local network, a long distance network, a packet network, or any combination thereof, as well as other types of networks. Network 520 may include an ASN, an ASN-GW, a WAG, a packet data gateway PDG, a mobile switching center MSC, and/or a packet data PDSN.

Base station 530 may be any wireless system that provides the WiMAX air interface to wireless devices 540 and 541 and communication connectivity to network 520. Examples of base stations that may be utilized include, BTSs, RBSs, Node B, eNBs, and others. Base stations may include a number of elements known to those skilled in the art comprising a transceiver, power amplifier, combiner, duplexer, antenna and control function.

Wireless device 540 may be associated with a public safety function. For example, wireless device 540 may be used by public safety personnel. Examples of public safety functions are police, fire department, disaster response, emergency medical personnel, and government officials. Wireless device 540 may be used by a public safety function to communicate with other public safety functions such as command post 510 and resources 511. Base station 530 may determine that wireless device 540 is associated with a public safety function when base station 530 receives a registration message from wireless device 540. In an embodiment, the registration message received by base station 530 may indicate that wireless device 540 is associated with a public safety function. In an embodiment, base station 530 or network 520 may determine wireless device 540 is associated with a public safety function by querying a database.

Wireless device 541 may be associated with a standard subscriber. For example, wireless device 541 may be associated with a member of the general public. Wireless device 541 may be used by a standard subscriber to communicate with user 512 who is also a member of the general public. Base station 530 may determine that wireless device 541 is associated with standard subscriber when base station 530 receives a registration message from wireless device 541. In an embodiment, the registration message received by base station 530 may indicate that wireless device 541 is associated with a standard subscriber. In an embodiment, base station 530 or network 520 may determine wireless device 541 is associated with a standard subscriber by querying a database.

To communicate with network 520, wireless device 540 and wireless device 541 may exchange data with base station 530 via WiMAX wireless links 545 and 546, respectively. Data flow from wireless device 540 or wireless device 541 to base station 530 is, for the purposes of this discussion, referred to as the uplink direction. Data flow from base station 530 to wireless device 540 or wireless device 541 is, for the purposes of this discussion, referred to as the downlink direction.

Because wireless device 540 and wireless device 541 share the same frequency band, WiMAX protocol uplink transmissions from wireless device 540 and 541 are multiplexed in both time and frequency. Each unique combination of time (or symbol) and frequency is called a slot. Base station 530 may dynamically allocate slots for wireless device 540 to use to transmit data. Base station 530 may also allocate different slots for wireless device 541 to use to transmit data. In addition, base station 530 may allocate a shared set of slots to both wireless device 540 and wireless device 541. In this case, wireless device 540 and wireless device 541 contend with each other for the use of the shared set of slots.

Base station 530 may allocate a set of shared slots for wireless device 540 and wireless device 541 to use to ask for additional allocations of slots (i.e., bandwidth requests). As with other shared slots, wireless device 540 and wireless device 541 contend with each other for the use of these bandwidth contention slots.

For example, wireless device 540 may randomly select a bandwidth contention slot. Wireless device 540 may then transmit a bandwidth request to base station 530 using this randomly selected bandwidth contention slot. If wireless device 540 does not receive a response from base station 530 granting bandwidth, then wireless device 540 may assume that the bandwidth request message was lost due to a collision with another wireless device (e.g., wireless device 541) that had also randomly selected that slot. Wireless device 540 may repeatedly randomly select another slot, and send another bandwidth request message until a request for bandwidth is granted.

In an embodiment, base station 530 allocates special contention slots (public safety contention slots) that are designated specifically for use by wireless devices associated with a public safety function (e.g., wireless device 540). These slots may not be shared with the contention slots allocated for use by wireless devices associated with standard subscribers (e.g., wireless device 541). Base station 530 communicates the public safety contention slots to wireless devices associated with public safety functions. Base station 530 communicates the non-public safety contention slots to the wireless devices associated with standard subscribers. Thus, base station 530 is able to differentiate bandwidth request messages coming from wireless devices associated with a public safety function from those coming from wireless devices associated with a standard subscriber. Base station 530 is then able to grant higher priority to the bandwidth requests coming from wireless devices associated with a public safety function.

In an embodiment, the number of public safety contention slots may be allocated dynamically. For example, the number of public safety contention slots can be a function of or more parameters that are configured by an operator. In an example, a parameter may be the number of registered or active users in the system. Basing the number of public safety contention slots on the number of registered or active users in the system relies on the notion that the lower bound on the volume of calls to/from public safety function personnel is proportional to the number of registered or active users.

In another example, the number of public safety contention slots may be based on the rate of increase of bandwidth requests. This rate of increase may be based on the rate of increase of bandwidth requests made in the public safety contention slots. This rate of increase may be based on the rate of increase of bandwidth requests made in the standard subscriber contention slots. Basing the number of public safety contention slots on the rate of increase in bandwidth requests relies on the notion that an abnormal increase should be taken to show a need to increase the allocation of public safety contention slots.

In another example, a message may be sent from network 520 or other base stations (not shown) that causes the allocation of public safety contention slots to be adjusted. The event causing a message to be sent from network 520 may be an alarm or other condition detected in the NOC. The event causing a message to be sent may be triggered by a nearby base station increasing its allocation of public safety contention slots. This increase by a nearby base station may indicate an increased likelihood that base station 530 needs to increase its allocation of public safety contention slots.

Figure 6:
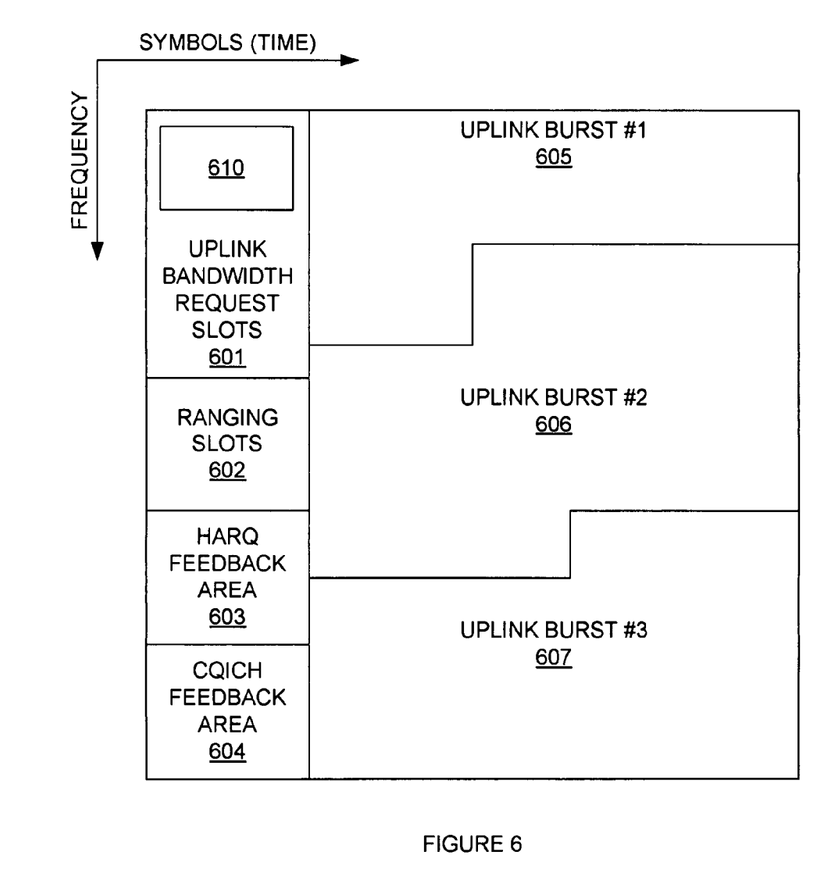
FIG. 6 is an illustration of a WiMAX uplink allocation.

FIG. 6 is an illustration of a WiMAX uplink allocation. In FIG. 6, groups of slots are shown with frequency on the vertical axis and symbols (e.g., time) on the horizontal axis. In FIG. 6, there is shown an allocation of uplink bandwidth request slots 601, ranging slots 602, hybrid automatic retransmission request (HARM) feedback slots 603, channel-quality indicator channel (CQICH) area 604, uplink burst #1 605, uplink burst #2 606, and uplink burst #3 607. Included in uplink bandwidth request slots 601 is a block of public safety contention slots 610. Thus, the allocation of uplink bandwidth request slots 601 is separated into slots that are for the exclusive use by wireless devices associated with a public safety function (i.e., public safety contention slots 610) and the remaining slots that may be used by wireless devices associated with standards subscribers. In an embodiment, the remaining bandwidth contention slots that are not allocated as public safety contention slots may also be used by wireless devices associated with a public safety function.

The methods, systems, devices, networks, base stations and so on above may be implemented with, contain, or be executed by one or more computer systems. The methods described above may also be stored on a computer readable medium. Many of the elements of communication system 100 and WiMAX communication system 500 may be, comprise, or include computers systems. This includes, but is not limited to: command post 110; resources 111; user 112, network 120; base station 130; wireless device 140; wireless device 141; command post 510; resources 511; user 512; network 520; base station 530; wireless device 540; and wireless device 541.

Figure 7:
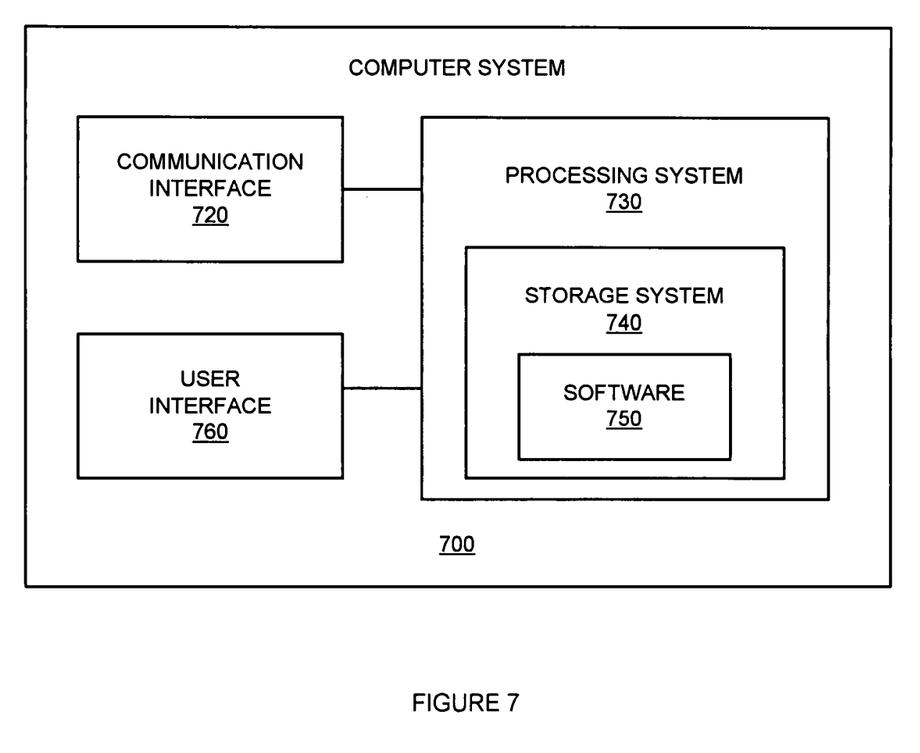
FIG. 7 is a block diagram of a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of allocating contention resources, comprising:
   allocating by an access point a first set of uplink contention slots for use by standard subscriber wireless devices, wherein the first set of uplink contention slots comprises a first subset and a second subset;
   allocating by the access point a second set of uplink contention slots for use by public safety wireless devices, wherein the second set of uplink contention slots comprises a first subset and a second subset and wherein the second set of uplink contention slots are non-overlapping with the first set of uplink contention slots;
   communicating by the access point the first set of uplink contention slots to the standard subscriber wireless devices;
   communicating by the access point the second set of uplink contention slots to the public safety wireless devices;
   determining a number of public safety wireless devices registered with the access point;
   determining a number of standard subscriber wireless devices registered with the access point;
   determining a rate of bandwidth requests from the public safety wireless devices and a rate of bandwidth requests from the standard subscriber wireless devices;
   re-allocating the first subset of the first set of uplink contention slots to the public safety wireless devices and the standard subscriber wireless devices when the number of public safety wireless devices registered with the access point increases and the rate of bandwidth requests from the public safety wireless devices increases, wherein the public safety wireless devices and the standard subscriber wireless devices share the first subset of the first set of uplink contention slots to request additional slot allocation;
   re-allocating the first subset of the second set of uplink contention slots to the public safety wireless devices and the standard subscriber wireless devices when the number of standard subscriber wireless devices registered with the access point increases and the rate of bandwidth requests from the standard subscriber wireless devices increases, wherein the public safety wireless devices and the standard subscriber wireless devices share the first subset of the second set of uplink contention slots to request additional slot allocation;
   communicating by the access point the re-allocated first subset of the first set of uplink contention slots to the public safety wireless devices and the standard subscriber wireless devices when the number of public safety wireless devices registered with the access point increases and the rate of bandwidth requests from the public safety wireless devices increases; and
   communicating by the access point the re-allocated first subset of the second set of uplink contention slots to the public safety wireless devices and the standard subscriber wireless devices when the number of standard subscriber wireless devices registered with the access point increases and the rate of bandwidth requests from the standard subscriber wireless devices increases.

2. The method of claim 1, further comprising:
   granting by the access point a higher priority to a bandwidth request message from a public safety wireless device than to a bandwidth request message from a standard subscriber wireless device.

3. A method of allocating contention resources, comprising:
   allocating at a first access point a set of first uplink contention slots for use by standard subscriber wireless devices, wherein the set of first uplink contention slots comprises a first subset and a second subset;
   allocating at the first access point a set of second uplink contention slots for use by public safety wireless devices, wherein the set of second uplink contention slots comprises a first subset and a second subset and wherein the set of second uplink contention slots are non-overlapping with the first set of uplink contention slots;
   communicating from the first access point the first set of uplink contention slots to the standard subscriber wireless devices;
   communicating from the first access point the second set of uplink contention slots to the public safety wireless devices;
   receiving a message from a second access point, wherein the message comprises an indication that the second access point re-allocated contention slots for use by public safety wireless devices based on a number of public safety devices registered with the second access point, a number of standard subscriber wireless devices registered with the second access point, a rate of bandwidth requests at the second access point from the public safety wireless devices registered with the second access point, and a rate of bandwidth requests at the second access point from the standard subscriber wireless devices registered with the second access node;

re-allocating the subset of the first uplink contention slots at the first access point based on the message from the second access point; and communicating from the first access point the re-allocated first subset of the first uplink contention slots to the public safety wireless devices and the standard subscriber wireless devices, wherein the public safety wireless devices and the standard subscriber wireless devices share the first subset of the first uplink contention slots to request additional slot allocation.

4. The method of claim 3, further comprising:

granting at the first access point a higher priority to a bandwidth request message from a public safety wireless device received within the re-allocated subset of the first uplink contention slots than to a bandwidth request message from a standard subscriber wireless device received within the re-allocated subset of the first uplink contention slots.

\* \* \* \* \*